United States Patent
Giberman

(10) Patent No.: US 10,203,030 B2
(45) Date of Patent: Feb. 12, 2019

(54) GEARING ARRANGEMENT

(71) Applicant: Illinois Tool Works Inc., Glenview, IL (US)

(72) Inventor: Alexander S. Giberman, Northbrook, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 307 days.

(21) Appl. No.: 15/185,543

(22) Filed: Jun. 17, 2016

(65) Prior Publication Data

US 2017/0002915 A1   Jan. 5, 2017

Related U.S. Application Data

(60) Provisional application No. 62/188,148, filed on Jul. 2, 2015.

(51) Int. Cl.
*B23B 5/00*        (2006.01)
*F16H 55/18*       (2006.01)
(Continued)

(52) U.S. Cl.
CPC ............. *F16H 55/18* (2013.01); *B23B 5/163* (2013.01); *F16D 1/093* (2013.01); *F16H 1/06* (2013.01);
(Continued)

(58) Field of Classification Search
CPC .. B23B 5/163; B23B 5/16; B23B 5/08; F16H 55/00; B23D 21/04; B23Q 1/40;
(Continued)

(56) References Cited

U.S. PATENT DOCUMENTS 257,833 A    5/1882    Warren et al.
768,128 A    5/1904    Jackson
(Continued)

FOREIGN PATENT DOCUMENTS

AU    2006282045 A1    6/2006
CN       1093959 A     10/1994
(Continued)

OTHER PUBLICATIONS

International Search Report and Written Opinion for PCT/US2013/077718 dated Sep. 5, 2014, 14 pages.

(Continued)

*Primary Examiner* — Will Fridie, Jr.
(74) *Attorney, Agent, or Firm* — Klintworth & Rozenblat IP LLP

(57) ABSTRACT

A pipe machining apparatus includes a frame, a tool support mounted on a tool carrier which is mounted on the frame, and a gearing arrangement for rotating the frame, and a motor for rotating the gearing arrangement. The gearing arrangement includes a toothed pinion gear, a toothed backlash adjustment gear which is moveable relative to the pinion gear and being capable of being fixed in position relative to the pinion gear by a locking assembly, and a toothed bull gear affixed to the tool carrier. The teeth of the bull gear are capable of being engaged with the teeth of the pinion gear and with the teeth of the backlash adjustment gear, the bull gear to minimize backlash.

12 Claims, 10 Drawing Sheets

(51) Int. Cl.
*B23B 5/16* (2006.01)
*F16H 1/06* (2006.01)
*F16H 57/12* (2006.01)
*F16D 1/093* (2006.01)

(52) U.S. Cl.
CPC .......... *F16H 57/12* (2013.01); *B23B 2215/72* (2013.01); *B23B 2260/07* (2013.01)

(58) Field of Classification Search
CPC .......... B23Q 1/26; B23Q 9/0021; B23Q 5/00; B26D 3/16
See application file for complete search history.

(56) References Cited

U.S. PATENT DOCUMENTS

| | | | |
|---|---|---|---|
| 2,074,334 A | 9/1913 | Vosper | |
| 1,097,152 A | 5/1914 | Wagner | |
| 1,279,022 A | 9/1918 | Scott | |
| 1,979,966 A | 11/1934 | Farr et al. | |
| RE20,974 E | 1/1939 | Guirl et al. | |
| 2,537,916 A | 1/1951 | Rosenboom | |
| 2,567,833 A | 9/1951 | Warren et al. | |
| 2,635,270 A | 4/1953 | Dawson | |
| 3,650,514 A | 3/1972 | Stunkard | |
| 3,744,356 A * | 7/1973 | Slator | B23B 5/163 82/113 |
| 3,807,047 A * | 4/1974 | Sherer | B23D 21/02 30/101 |
| 3,819,163 A | 6/1974 | Stunkard | |
| 3,848,489 A | 11/1974 | Santana | |
| 4,050,335 A | 9/1977 | Gilmore | |
| 4,063,355 A | 12/1977 | Netzel | |
| 4,318,391 A | 3/1982 | Wachs et al. | |
| 4,482,136 A | 11/1984 | Wolf et al. | |
| 4,490,909 A | 1/1985 | Wachs et al. | |
| 4,543,861 A | 10/1985 | Kwech et al. | |
| 4,614,136 A | 9/1986 | Pertle | |
| 4,625,464 A | 12/1986 | Kubo | |
| 4,655,108 A | 4/1987 | Galos | |
| 4,677,884 A | 7/1987 | Kwech et al. | |
| 4,682,919 A | 7/1987 | Mitchell | |
| 4,739,685 A * | 4/1988 | Ricci | B23B 3/26 30/97 |
| 4,762,038 A | 8/1988 | Olson | |
| 4,770,074 A * | 9/1988 | Kwech | B23B 5/163 30/97 |
| 4,791,842 A | 12/1988 | Olson | |
| 4,813,314 A * | 3/1989 | Kwech | B23B 5/163 30/97 |
| 4,939,964 A | 7/1990 | Ricci | |
| 5,054,342 A | 10/1991 | Swiatowy et al. | |
| 5,123,771 A | 6/1992 | Okuno | |
| 5,159,868 A | 11/1992 | Thomas et al. | |
| 5,368,399 A | 11/1994 | Tremblay | |
| 5,429,021 A | 7/1995 | Astle et al. | |
| 5,467,627 A | 11/1995 | Smith et al. | |
| 5,549,024 A * | 8/1996 | Ricci | B23B 5/16 82/101 |
| 6,293,174 B1 | 9/2001 | Rulseh | |
| 6,427,567 B1 * | 8/2002 | Ricci | B23B 5/163 82/113 |
| 6,615,696 B2 * | 9/2003 | Ricci | B23B 3/265 82/113 |
| 6,619,164 B1 | 9/2003 | Ricci et al. | |
| 6,810,587 B1 | 11/2004 | Robertson | |
| 6,966,731 B2 | 11/2005 | VanderPol et al. | |
| 7,270,505 B2 | 9/2007 | VanderPol et al. | |
| 7,690,283 B1 * | 4/2010 | Hall | B23B 3/22 82/113 |
| 8,051,753 B2 * | 11/2011 | Ricci | B23B 5/38 82/113 |
| 8,250,953 B2 | 8/2012 | Hall et al. | |
| 8,584,558 B2 | 11/2013 | Phillips et al. | |
| 9,050,669 B2 * | 6/2015 | Coakley | B23B 5/08 |
| 9,475,160 B2 * | 10/2016 | Coakley | B23Q 1/25 |
| 10,065,246 B2 * | 9/2018 | Coakley | B23B 3/265 |
| 2001/0001935 A1 | 5/2001 | Wilk, Jr. | |
| 2007/0241250 A1 | 10/2007 | Wong | |
| 2009/0229919 A1 | 9/2009 | McDonald | |
| 2010/0162860 A1 | 7/2010 | Hall et al. | |
| 2010/0162862 A1 | 7/2010 | Hall et al. | |
| 2013/0152748 A1 | 6/2013 | Wokan et al. | |
| 2014/0190322 A1 | 7/2014 | Pierce et al. | |
| 2015/0053060 A1 | 2/2015 | Coakley | |

FOREIGN PATENT DOCUMENTS

| | | |
|---|---|---|
| CN | 2254385 Y | 5/1997 |
| CN | 2934709 Y | 8/2007 |
| CN | 101573198 A | 11/2009 |
| CN | 101932400 A | 12/2010 |
| DE | 3521697 A1 | 2/1986 |
| DE | 102005019349 A1 | 2/2006 |
| GB | 818753 A | 8/1959 |
| GB | 828940 A | 2/1960 |
| GB | 956906 A | 4/1964 |
| GB | 1450774 A | 9/1976 |
| JP | 2013-002606 A | 1/2013 |
| NL | 7907801 A | 4/1981 |
| SK | 277770 B6 | 12/1994 |
| TW | 201129436 A | 9/2011 |
| WO | 2007024326 A1 | 3/2007 |
| WO | 2007/052035 A1 | 5/2007 |
| WO | 2010/077346 A1 | 7/2010 |

OTHER PUBLICATIONS

International Preliminary Report on Patentability from corresponding International Patent Application No. PCT/US2016/040496 dated Jan. 11, 2018, 9 pages.
International Search Report and Written Opinion for PCT/US2013/077721 dated Aug. 22, 2014, 19 pages.
International Search Report and Written Opinion for PCT/US2013/077719 dated Jul. 4, 2014, 18 pages.
International Search Report and Written Opinion from corresponding International Application PCT/US2016/040496 dated Sep. 14, 2016, 14 pages.
Office Action from corresponding Canadian Patent Application No. 2,991,065 dated Oct. 2, 2018, 3 pages.

* cited by examiner

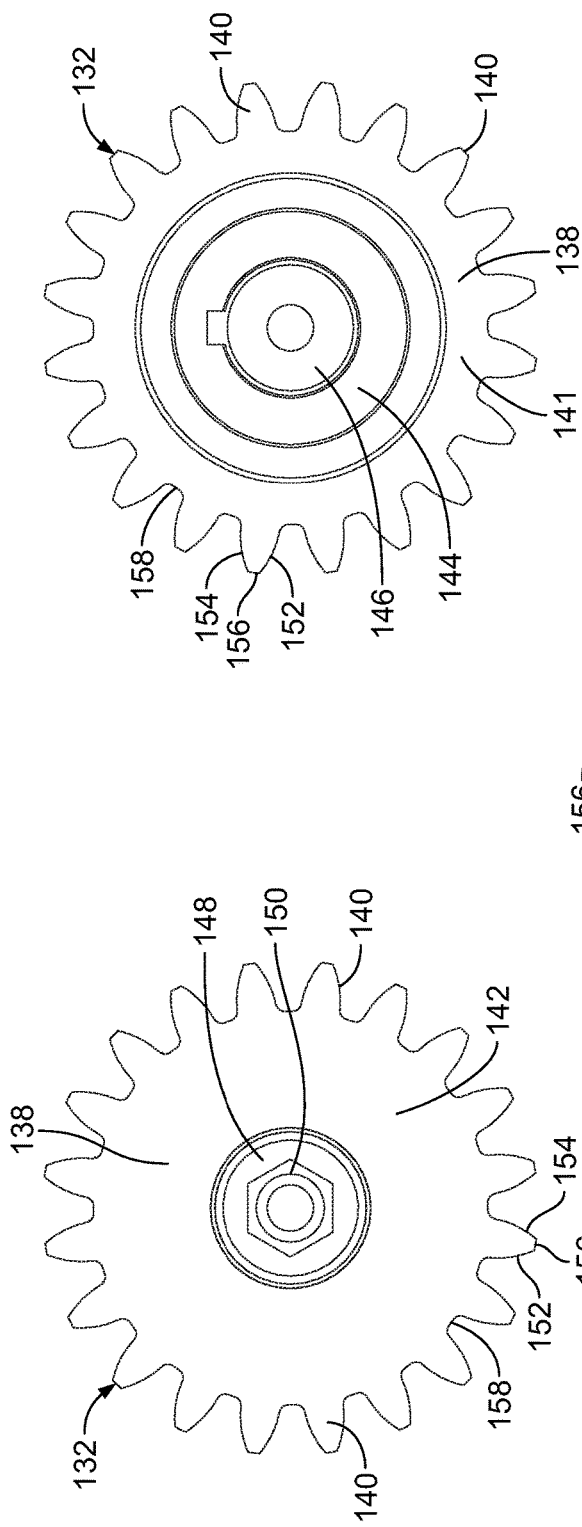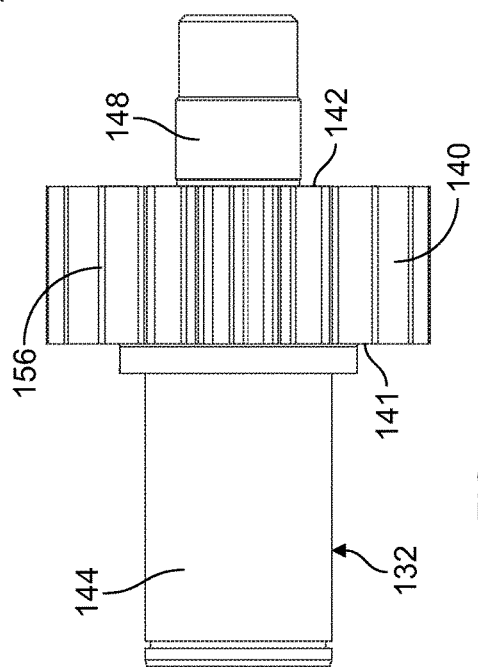

GEARING ARRANGEMENT

This application claims the domestic benefit of U.S. Provisional Application Ser. No. 62/188,148, filed on Jul. 2, 2015, the contents of which are incorporated herein in its entirety.

FIELD OF THE DISCLOSURE

The present disclosure generally relates to a gearing arrangement for reducing backlash, and particularly a gearing arrangement for use in a pipe end machining apparatus.

BACKGROUND

When a pair of gears mesh with each other, respective gear teeth engage with corresponding tooth spaces. Backlash is defined as the clearance between the gear teeth in a circumferential direction when the gears engage with each other. Backlash occurs when a pair of gears engage with each other, and one gear rotates in one direction and the other gear rotates in the opposite direction. The backlash occurs between the gears rotating in opposite directions. Built-in backlash is a tool for providing extra space between meshed teeth in an effort to overcome manufacturing errors. Excessive backlash causes unwanted chatter and vibration during operation.

SUMMARY

In one aspect, a pipe machining apparatus includes a frame, a tool support mounted on a tool carrier which is mounted on the frame, and a gearing arrangement for rotating the frame, and a motor for rotating the gearing arrangement. The gearing arrangement includes a toothed pinion gear, a toothed backlash adjustment gear which is moveable relative to the pinion gear and being capable of being fixed in position relative to the pinion gear by a locking assembly, and a toothed bull gear affixed to the tool carrier. The teeth of the bull gear are capable of being engaged with the teeth of the pinion gear and with the teeth of the backlash adjustment gear, the bull gear to minimize backlash.

According to an aspect, when the locking assembly is in a first position, the pinion gear and the backlash adjustment gear are rotatable relative to each other, and when the locking assembly is in a second position, the pinion gear and the backlash adjustment gear are not rotatable relative to each other.

According to an aspect, the locking assembly includes an inner collar having an outer surface with upper angled portion and a lower angled portion, the inner collar engaged with the pinion gear, the inner collar formed from an interrupted ring having a slot therein; an outer collar having an inner surface with upper angled portion and a lower angled portion, the outer collar formed from an interrupted ring having a slot therein, the outer collar capable of being engaged with the backlash adjustment gear; an upper circular ring positioned between the upper angled portions of the inner and outer collars, the upper circular ring having an outer angled surface which is configured to engage the upper angled portions of the inner and outer collars; a lower circular ring positioned between the lower angled portions of the inner and outer collars, the lower circular ring having an outer angled surface which is configured to engage the lower angled portions of the inner and outer collars; and a plurality of fasteners extending through the upper and lower rings, wherein rotation of the fasteners causes the upper and lower rings to move relative to the inner and outer collars, thereby contracting the inner collar and expanding the outer collar.

The scope of the present disclosure is defined solely by the appended claims and is not affected by the statements within this summary.

DESCRIPTION OF THE DRAWINGS

FIG. 5 is a bottom plan view of a pinion gear which forms part of the gearing arrangement;

FIG. 6 is a top plan view of the pinion gear of FIG. 5;

FIG. 7 is a side elevation view of the pinion gear of FIG. 5;

DETAILED DESCRIPTION

Figure 1:
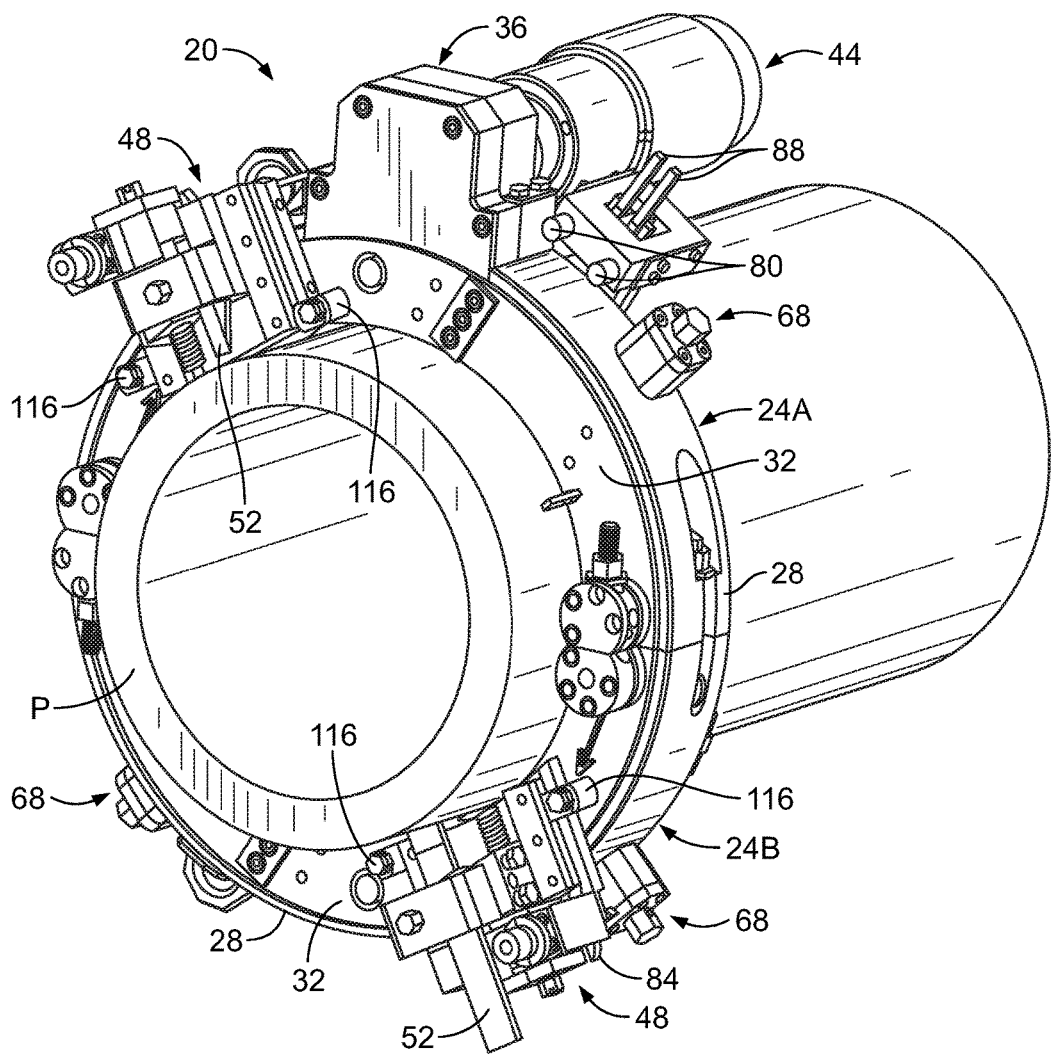
FIG. 1 is a bottom perspective view of a pipe machining apparatus which may incorporate a gearing arrangement of the present disclosure.
Figure 2:
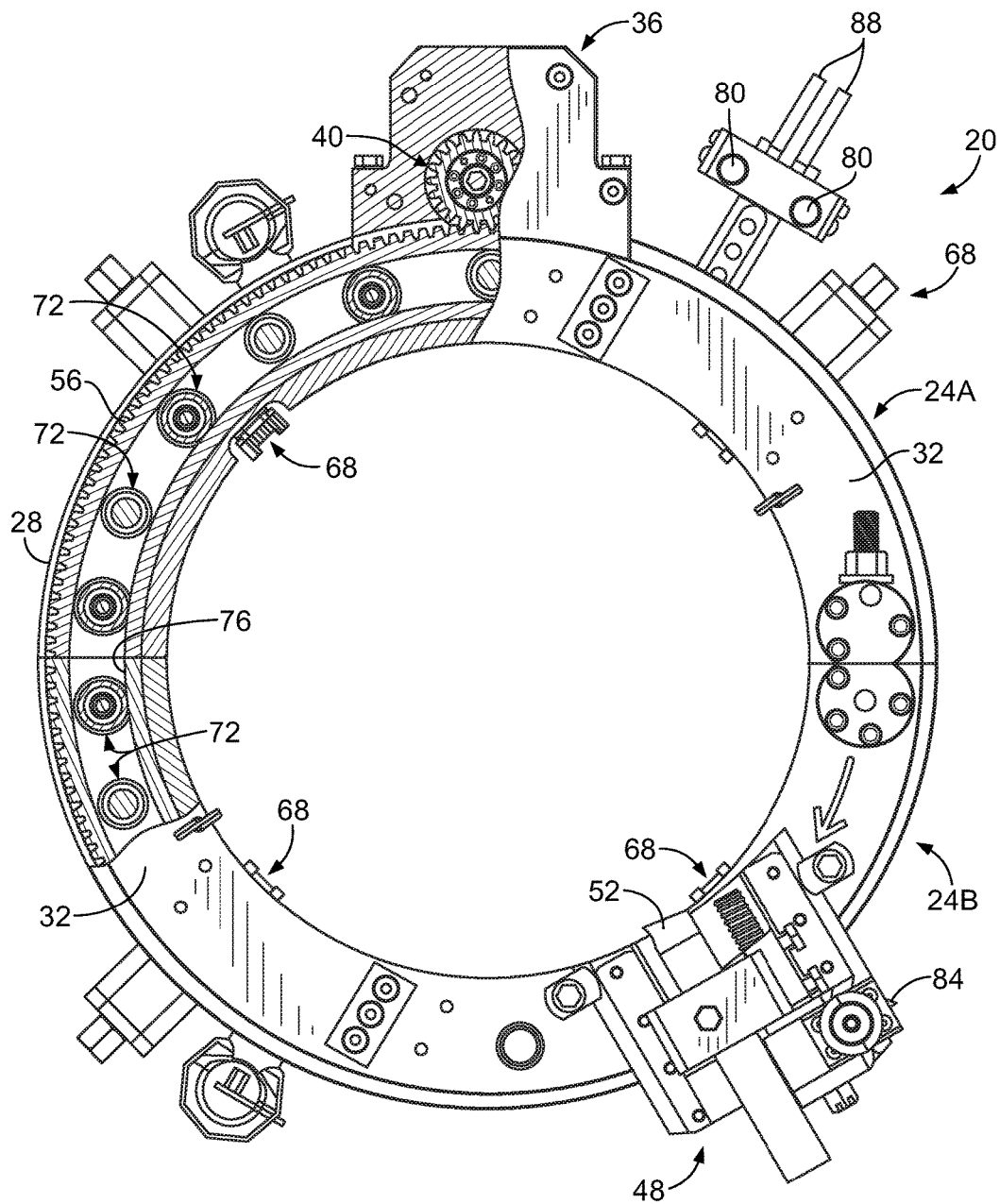
FIG. 2 is a bottom plan view of the pipe machining apparatus and gearing arrangement.
Figure 3:
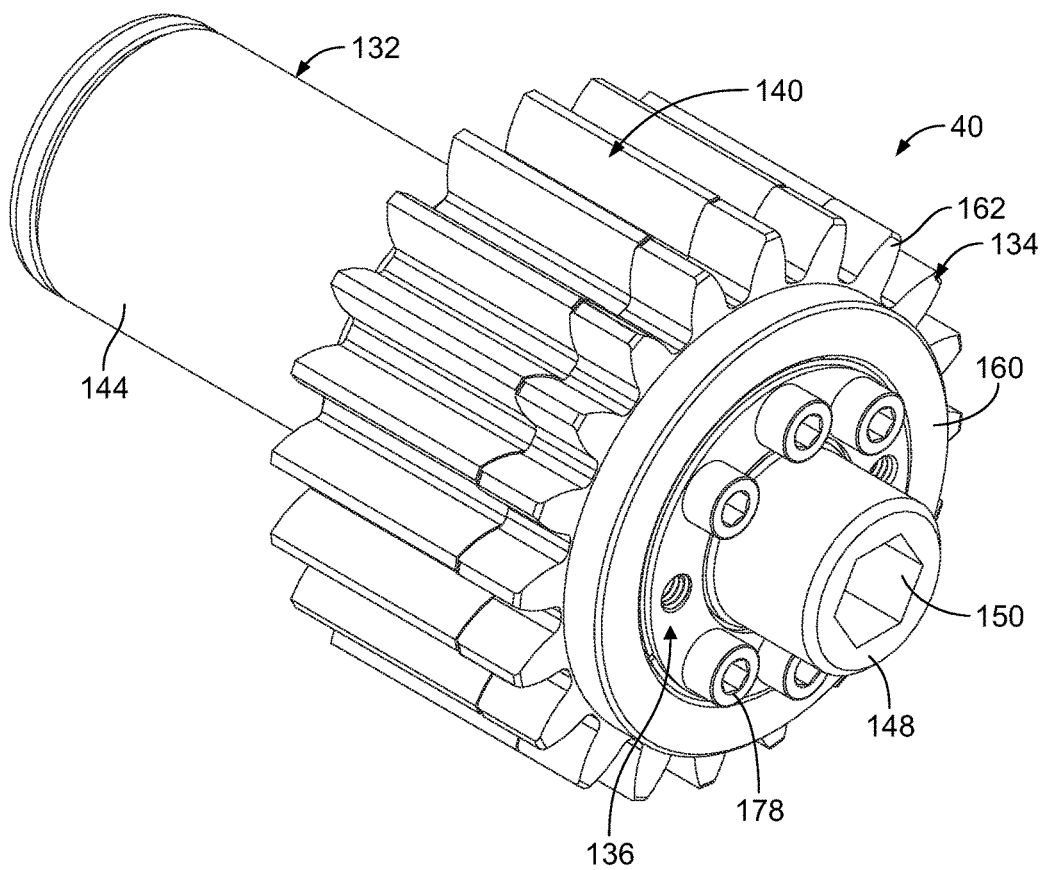
FIG. 3 is a bottom perspective view of a portion of the gearing arrangement.
Figure 4:
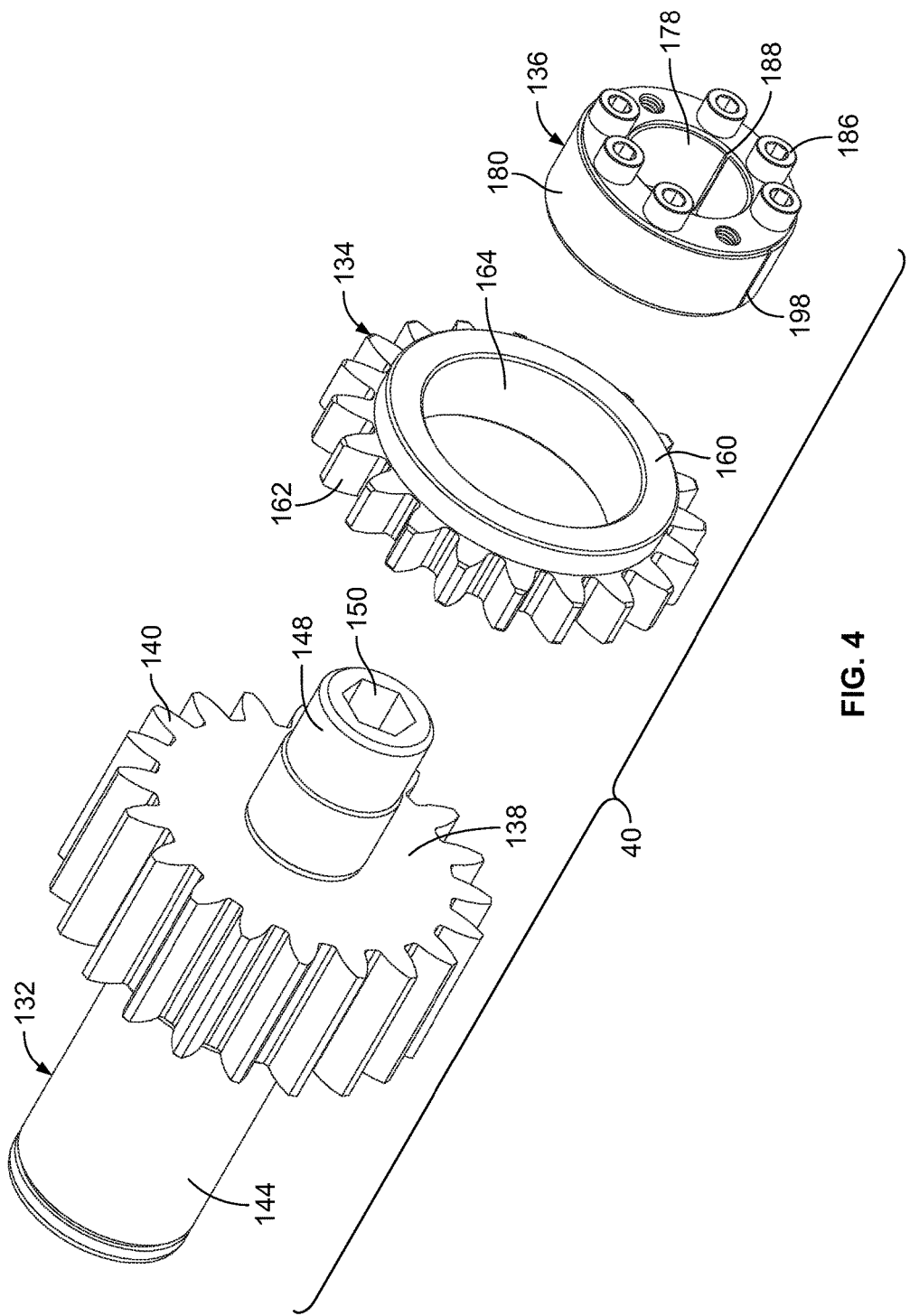
FIG. 4 is an exploded, bottom perspective view of a portion of the gearing arrangement.

With reference to FIG. 3, a gearing arrangement 40 is provided for minimizing backlash, and may be used in a pipe machining apparatus 20 as shown in FIGS. 1 and 2. The gearing arrangement 40 may be used in a pipe machining apparatus 20, but is applicable to other apparatuses.

With reference to FIGS. 1 and 2, there is shown one exemplary embodiment of a pipe machining apparatus 20 adapted to machine pipes P of varying diameters. In some exemplary embodiments, the pipe machining apparatus 20 completely cuts through the pipe P. In other exemplary embodiments, the pipe machining apparatus 20 prepares an end of a pipe P for coupling to another pipe. In still other exemplary embodiments, the pipe machining apparatus 20 both completely cuts and prepares a pipe P for coupling to another pipe.

Figure 13:
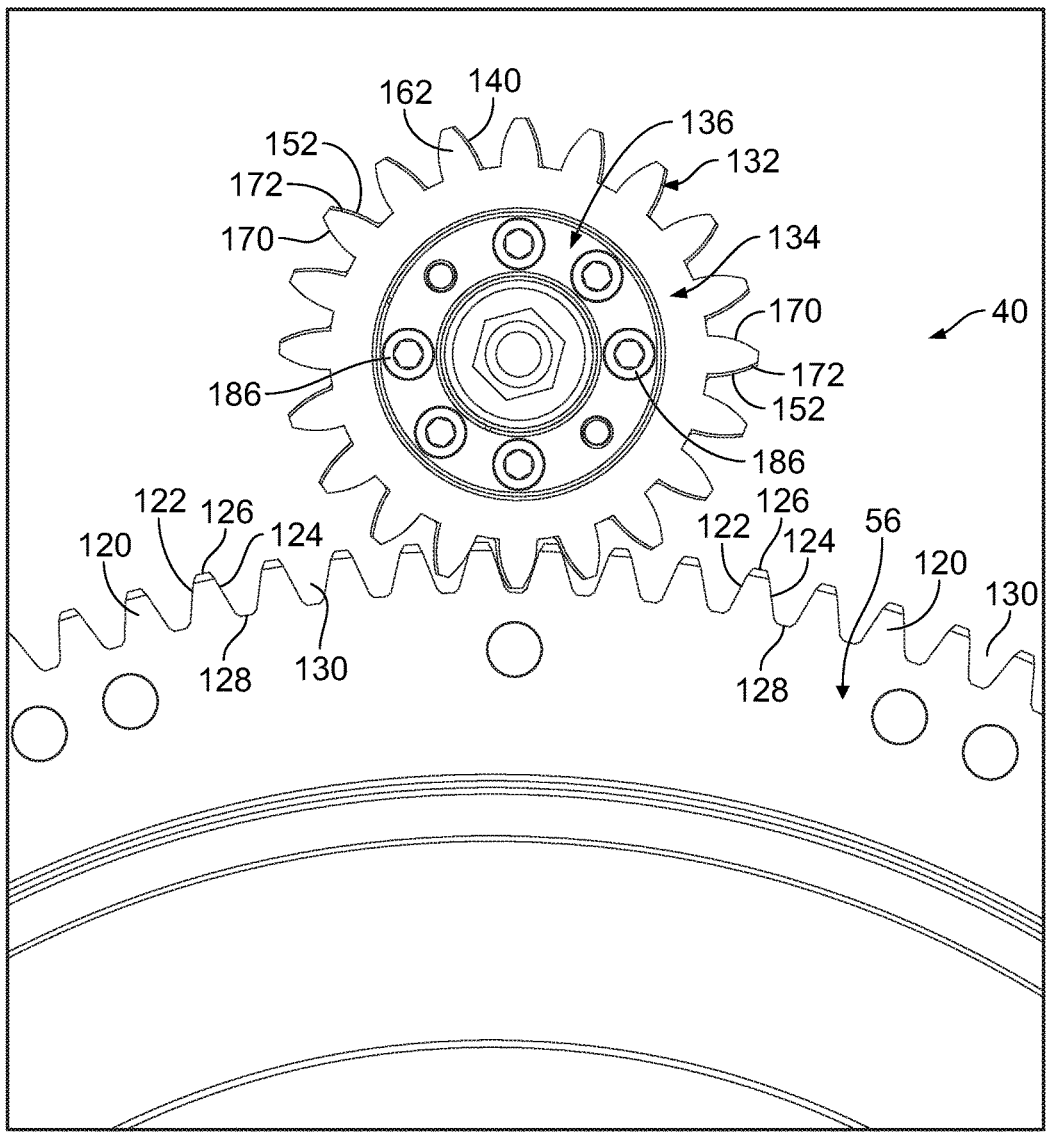
FIG. 13 is a partial, bottom plan view of the gearing arrangement.
Figure 14:
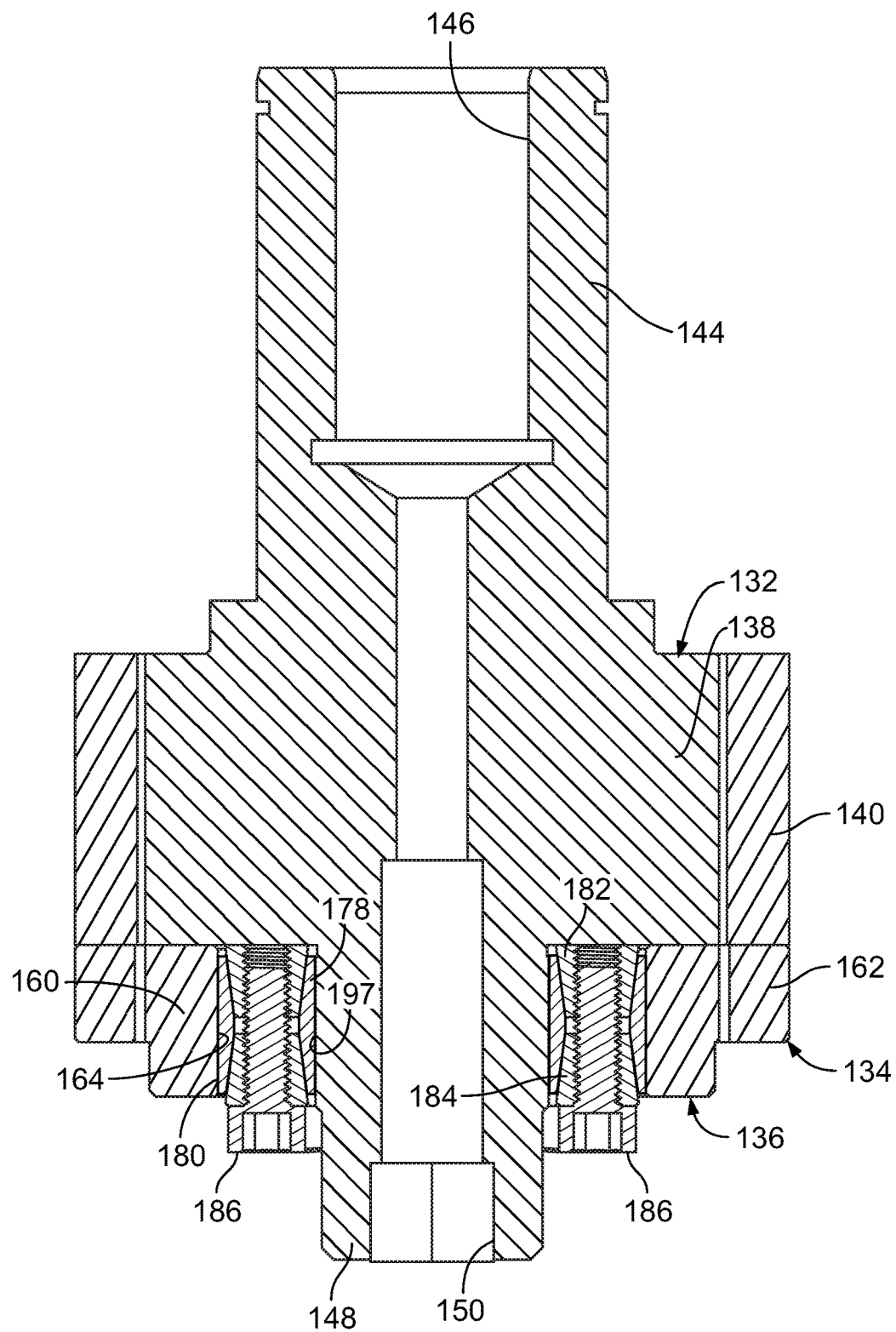
FIG. 14 is a cross-sectional view of the pinion gear, the backlash adjustment gear and the locking assembly in an assembled condition.

In the illustrated exemplary embodiment, the pipe machining apparatus 20 is formed of two joined-together semicircular sections 24A, 24B and includes a frame 28 and a tool carrier 32. The two sections 24A, 24B together comprise the frame 28 and the tool carrier 32 such that a first portion of the frame 28 and a first portion of the tool carrier 32 is included in one section 24A and a second portion of the frame 28 and a second portion of the tool carrier 32 is included in the other section 24B. The frame 28 has a column 36 extending outwardly of the two semicircular sections 24A, 24B and houses the gearing arrangement 40 adapted to couple with a suitable drive motor 44. The gearing arrangement 40 is rotatably mounted in the column 36. The frame 28 is adapted to couple and be fixed relative to the pipe P, and the tool carrier 32 is rotatable relative to the fixed frame 28 and the pipe P. The motor 44 is adapted to rotate the tool carrier 32 relative to the frame 28 through the gearing arrangement 40. The tool carrier 32 has a circular bull gear 56 for meshing with the gearing arrangement 40. As best shown in FIG. 13, the bull gear 56 has a plurality of spaced apart teeth 120 around the circumference of the bull gear 56. Each tooth 120 has a pair of flanks 122, 124 which are joined together by a top land 126 at their outer ends. The flanks 122, 124 are angled relative to the respective top land 126. The top lands 126 form an imaginary circle around the circumference of the bull gear 56. Adjacent teeth 120 are spaced apart from each other by a root 128 such that adjacent teeth 120 are spaced apart from each other by a space 130.

The rotatable tool carrier 32 includes one or more tool supports 48 (two tool supports shown in the illustrated exemplary embodiment) which are capable of carrying tools, such as cutting or machining tools 52 which are used to perform a cutting or machining operation on the pipe P as the tools 52 rotate circumferentially about the pipe P in a known manner. The machining operation performed by the cutting or machining tool(s) 52 may form a straight edge perpendicular to a longitudinal extent of the pipe P, a bevel on an end of the pipe P that is transverse to the longitudinal extend of the pipe P and at an angle other than ninety degrees, or an edge of a pipe P having any angle. The tool carrier 32 is rotatably mounted on and supported by the frame 28 by a plurality of roller bearings 72. The roller bearings 72 ride in a circular bearing race 76 on the interior of tool carrier 32. The tool supports 48 are coupled to the tool carrier 32 by one or more coupling members 116 (two shown in the exemplary illustrated embodiment) and are adjustable relative to the pipe P to bring the tool carrier 32 into contact with or in close proximity to an outer periphery of the pipe P.

A plurality of projections 80 are adjustably movable into and out of a path of an advancement member 84 coupled to each tool support 48 to advance the cutting or machining tool 52 toward the pipe P. In the illustrated exemplary embodiment, the apparatus 20 includes a total of two projections 80 for engaging the advancement members 84, however, the apparatus 20 may include any number of projections 80. Each projection 80 is coupled to a lever 88 that may be actuated by a user to selectively move the projection 80 into and out of the path of the advancement members 84.

The apparatus 20 further includes four adjustable clamp members or coupling members 68 engageable with an exterior of the pipe P and having suitable adjustability to couple and concentrically locate the apparatus 20 to the pipe P.

The gearing arrangement 40 is formed of the bull gear 56, a pinion gear 132, a backlash adjustment gear 134 and a locking assembly 136 for fixing the position of the backlash adjustment gear 134 relative to the pinion gear 132 and relative to the bull gear 56. The positions of the pinion gear 132 and the backlash adjustment gear 134 are adjusted relative to each other, and are fixed relative to each other, in order to fill the space 130 between adjacent teeth 120 in the bull gear 56, thereby minimizing the backlash between the gears 56, 132, 134.

As shown in FIGS. 5-7, the pinion gear 132 is formed from a circular base 138 having a plurality of spaced apart teeth 140 extending outwardly from the base 138 and around the outer circumference of the base 138. A bottom surface 142 of the base 138 is planar, and a top surface 141 of the base 138 may be planar. A shaft 144 extends outwardly from the top surface 141 of the base 138. The shaft 144 may have steps provided along its length. The shaft 144 has an engagement recess 146 in its end for engaging with a drive shaft of the motor 44. A shaft 148 extends outwardly from the bottom surface 142 of the base 138. The shaft 148 may have steps provided along its length. The shaft 148 has an engagement recess 150 in its end for engaging with a tool. Each tooth 140 has a pair of flanks 152, 154 which are joined together by a top land 156 at their outer ends. Adjacent teeth 140 are spaced apart from each other by a root 158. The flanks 152, 154 are angled relative to the respective top land 156. The flanks 152, 154 may be curved. The top lands 156 form an imaginary circle around the circumference of the pinion gear 132.

Figure 9:
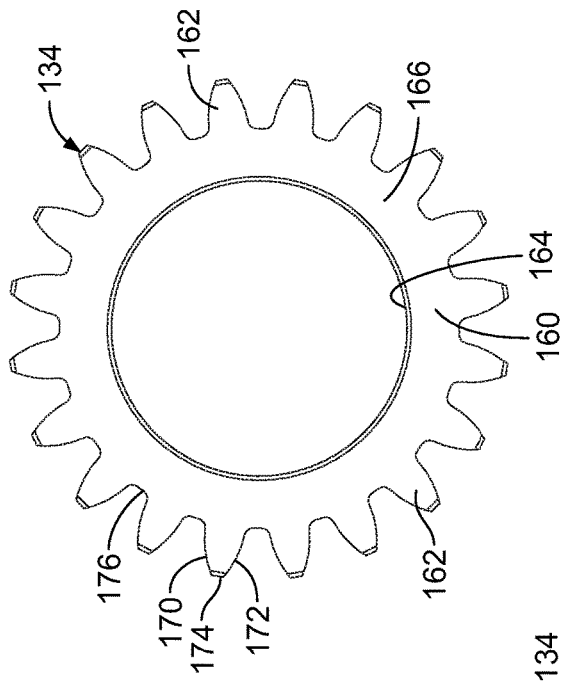
FIG. 9 is a top plan view of the backlash adjustment gear of FIG. 8.
Figure 10:
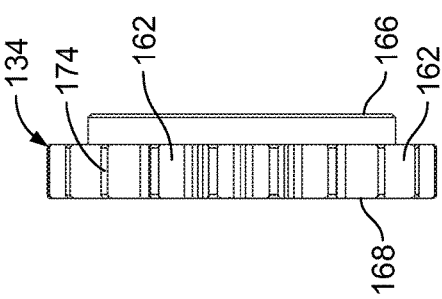
FIG. 10 is a side elevation view of the backlash adjustment gear of FIG. 8.
Figure 8:
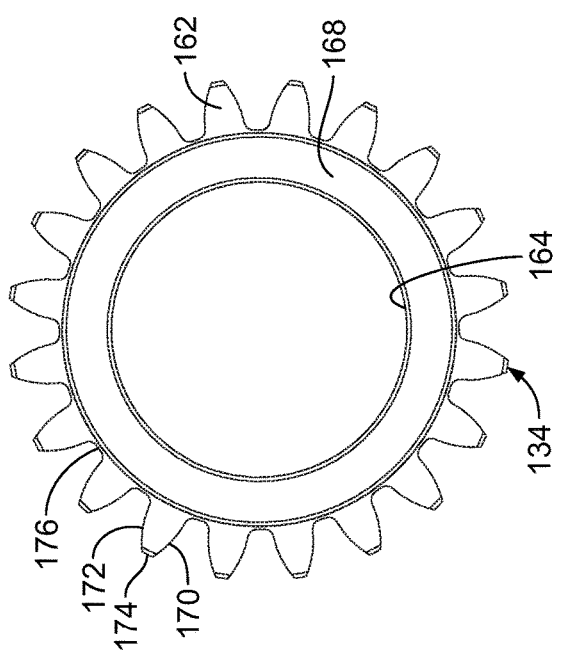
FIG. 8 is a bottom plan view of a backlash adjustment gear which forms part of the gearing arrangement.

As shown in FIGS. 8-10, the backlash adjustment gear 134 is formed from a circular base 160 having a plurality of spaced apart teeth 162 extending outwardly from the base 160 and around the outer circumference of the base 160. The teeth 162 may not extend along the entire length of the base 160. A passageway 164 is defined through the base 160 from a top surface 166 thereof to a bottom surface 168 thereof. The passageway 164 defines an inner wall. The top surface 166 is planar and the bottom surface 168 may be planar. Each tooth 162 has a pair of flanks 170, 172 which are joined together by a top land 174 at their outer ends. Adjacent teeth 162 are spaced apart from each other by a root 176. The flanks 170, 172 are angled relative to the respective top land 174. The flanks 170, 172 may be curved. The top lands 174 form an imaginary circle around the circumference of the backlash adjustment gear 134.

The teeth 140 of the pinion gear 132 and the teeth 162 of the backlash adjustment gear 134 may have the same profile such that when the gears 132, 134 are aligned with each other, the flanks 152, 154 of each tooth 140 align with the flanks 170, 172 of each respective tooth 162.

As shown in FIGS. 4 and 11-15, the locking assembly 136 includes an inner collar 178, an outer collar 180, an upper circular ring 182 positioned between the inner and outer collars 178, 180, a lower circular ring 184 positioned between the inner and outer collars 178, 180 and a plurality of fasteners 186 extending through the upper and lower rings 182, 184. The fasteners 186 are used to adjust the position of the upper and lower rings 182, 184 relative to each other, which then adjusts the positions of the inner and outer collars 178, 180 relative to each other.

Figure 11:
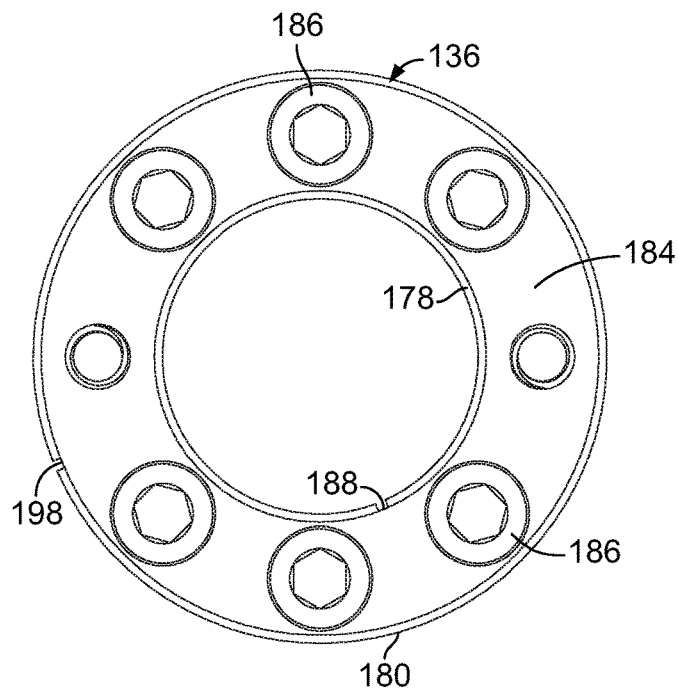
FIG. 11 is a bottom plan view of a locking assembly which forms part of the gearing arrangement.
Figure 12:
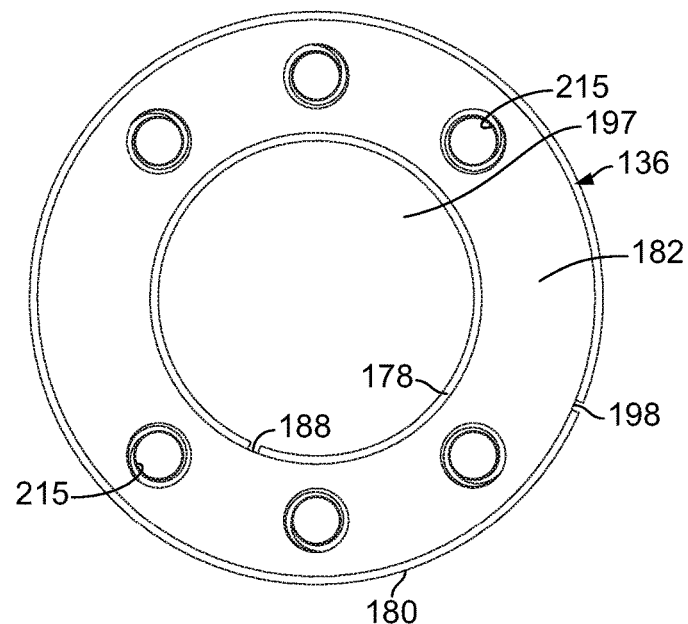
FIG. 12 is a top plan view of the locking assembly of FIG. 11.
Figure 15:
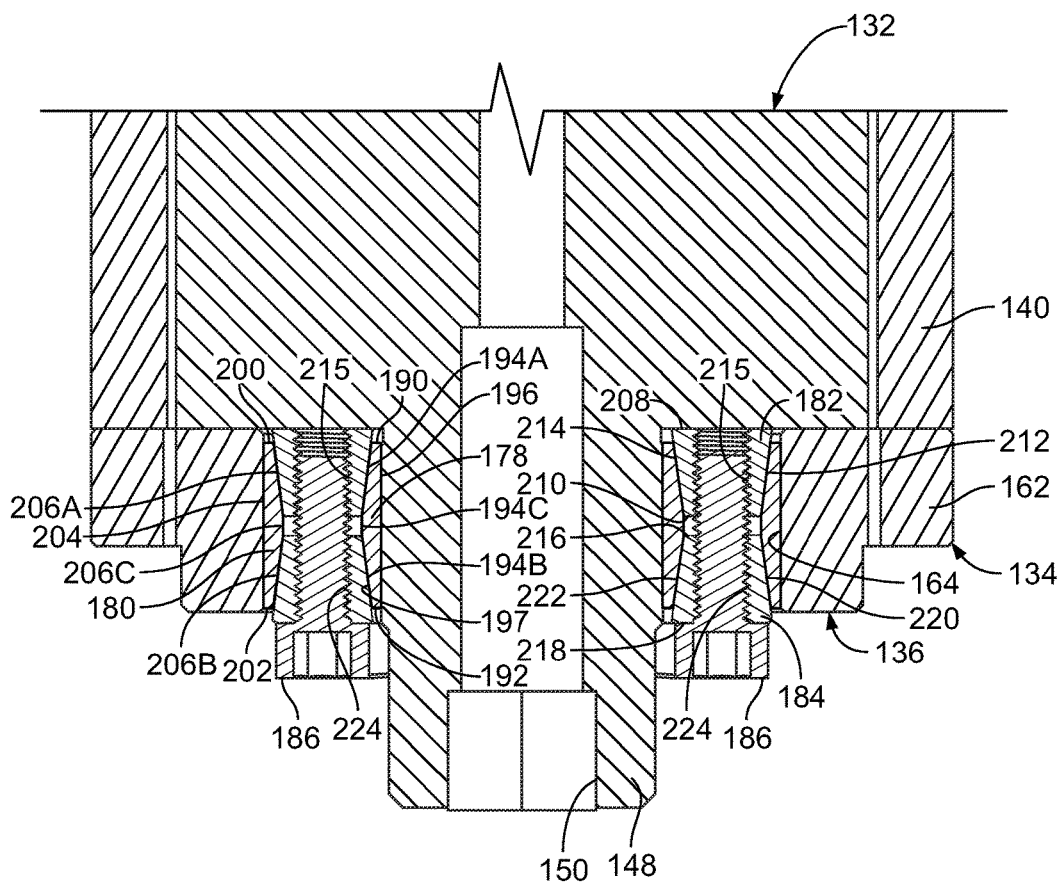
FIG. 15 is an enlarged, partial a cross-sectional view of the pinion gear, the backlash adjustment gear and the locking assembly in the assembled condition.

As shown in FIGS. 11 and 12, the inner collar 178 is formed of a substantially circular body having ends that are separated by a slot 188. If the slot 188 was eliminated, the body of the inner collar 178 would form a complete circle. Therefore, the inner collar 178 is formed by an interrupted circular body. As shown in FIG. 15, the inner collar 178 has a planar top surface 190, a planar bottom surface 192, an outer surface 194A, 194B, 194C, and a circular inner surface 196. The outer surface 194A, 194B, 194C has an upper angled portion 194A which angles outwardly from the top surface 190 toward the bottom surface 192, a lower angled portion 194B which angles outwardly from the bottom surface 192 toward the top surface 190, and an intermediate circular portion 194C between the upper and lower portions 194A, 194B.

As shown in FIGS. 11 and 12, the outer collar 180 is formed of a substantially circular body having ends that are separated by a slot 198. If the slot 198 was eliminated, the body of the outer collar 180 would form a complete circle. Therefore, the outer collar 180 is formed by an interrupted circular body. As shown in FIG. 15, the outer collar 180 has a planar top surface 200, a planar bottom surface 202, a circular outer surface 204, and an inner surface 206A, 206B, 206C. The inner surface 206A, 206B, 206C has an upper angled portion 206A which angles inwardly from the top surface 200 toward the bottom surface 202, a lower angled portion 206B which angles inwardly from the bottom surface 202 toward the top surface 200, and an intermediate circular portion 206C between the upper and lower portions 206A, 206B.

When the inner collar 178 is placed within the outer collar 180, the outer surface 194A, 194B, 194C of the inner collar 178 and the inner surface 206A, 206B, 206C of the outer collar 180 define a passageway 197 therebetween.

The upper ring 182 has a planar top surface 208, a planar bottom surface 210, an angled outer surface 212 and an angled inner surface 214. The outer surface 212 angles inwardly from the top surface 208 to the bottom surface 210. The inner surface 214 angles outwardly from the top surface 208 to the bottom surface 210. A plurality of spaced apart threaded passageways 215 are provided through the upper ring 182 through which the fasteners 186 extend.

The lower ring 184 has a planar top surface 216, a planar bottom surface 218, an angled outer surface 220, and an angled inner surface 222. The outer surface 220 angles outwardly from the top surface 216 to the bottom surface 218. The inner surface 222 angles outwardly from the top surface 216 to the bottom surface 218. A plurality of spaced apart threaded passageways 224 are provided through the lower ring 184 through which the fasteners 186 extend.

In use, the rings 182, 184 seat within the passageway 197 formed between the collars 178, 180. The inner surface 214 of the upper ring 182 engages with the upper angled portion 194A of the inner collar 178, and the outer surface 212 of the upper ring 182 engages with the upper angled portion 206A of the outer collar 180. The inner surface 222 of the lower ring 184 engages with the lower angled portion 194B of the inner collar 178, and the outer surface 220 of the lower ring 184 engages with the lower angled portion 206B of the outer collar 180. A space may be formed between the bottom surface 210 of the upper ring 182 and the top surface 216 of the lower ring 184. The passageways 215, 224 align with each other and a threaded fastener 186 extends through sets of aligned threaded passageways 215, 224 and threadedly engages with the threaded passageways 215, 224.

The locking assembly 136 seats within the passageway 164 of the backlash adjustment gear 134. The outer collar 180 is proximate to the inner wall defined by the passageway 164. The backlash adjustment gear 134 seats against the pinion gear 132 such that the top surface 166 of the base 160 abuts against the bottom surface 142 of the base 138 of the pinion gear 132. The shaft 148 of the pinion gear 132 extends through the inner collar 178 such that the inner collar 178 is proximate to the outer surface of the shaft 148.

As shown in FIG. 13, the teeth 140, 162 of the backlash adjustment gear 134 and the pinion gear 132 interengage with the teeth 120 of the bull gear 56. In order to minimize the backlash, the position of the backlash adjustment gear 134 is adjusted relative to the pinion gear 132 to offset the teeth 140, 162, such the tooth space 130 of the bull gear 56 is filled or substantially filled by the offset teeth 140, 162. To set the position, the locking assembly 136 is positioned in a first or unlocked position such that the inner and outer collars 178, 180 do not tightly engage the shaft 148 and the backlash adjustment gear 134. In this first or unlocked position, the backlash adjustment gear 134 can rotate relative to the bull gear 56, the pinion gear 132 and the locking assembly 136, but the backlash adjustment gear 134 is limited in rotation to the extent of the tooth space 130 of the bull gear 56. Thereafter, the backlash adjustment gear 134 is rotated to a desired position relative to the bull gear 56 and the pinion gear 132 to minimize the backlash. In this position, the flank, for example flank 152 of each tooth 140 of the pinion gear 132 engages the flank 124 of the respective tooth 120 of the bull gear 56, and the flank 170 of each tooth 162 of the backlash adjustment gear 134 engages the flank 122 of the respective tooth 120 of the bull gear 56 where the teeth 120, 140, 162 interengage. The fasteners 186 are then rotated which causes the upper and lower rings 182, 184 to translate along the fasteners 186 toward each other. As the rings 182, 184 translate toward each other, the angled surfaces 214, 222 of the rings 182, 184 push the inner collar 178 inwardly to bear against the shaft 148 to contract the inner collar 178 (the ends of the body may close the slot 188), and the angled surfaces 212, 220 of the rings 182, 184 pushes the outer collar 180 outwardly to bear against the backlash adjustment gear 134 to expand the outer collar 180 (the ends of the body of the outer collar 180 further open the slot 198). This fixes the backlash adjustment gear 134 in position relative to the pinion gear 132. Thus, the backlash adjustment gear 134 and the pinion gear 132 cannot be rotated relative to each other once they are fixed in position by the locking assembly 136. When the backlash adjustment gear 134 and the pinion gear 132 cannot be rotated relative to each other, the locking assembly 136 is in a second or locked position. Since the tooth space 130 of the bull gear 56 is filled by the teeth 140, 162 of the pinion gear 132 and the backlash adjustment gear 134 as they interengage, the backlash is minimized during operation.

In use, the pipe machining apparatus 20 is mounted on the pipe P and the clamp members or coupling members 68 are engaged with the exterior of the pipe P to properly locate the apparatus 20. During operation of the apparatus 20, the motor 44 rotates the pinion gear 132, the locking assembly 136 and backlash adjustment gear 134 which are affixed together. The pinion gear 132 and backlash adjustment gear 134 rotates the bull gear 56. This causes the tool carrier 32, its tool supports 48 and its cutting or machining tools 52, to rotate relative to the frame 28 and the pipe P. The tool supports 48 are advanced to advance the cutting or machining tool 52 until the pipe P is machined to a desired extent (e.g., until the pipe is completely cut or parted). After the desired amount of machining is achieved, it may be desirable to retract the cutting or machining tool 52 along the tool support 48 from the advanced cutting position. This can be performed in a conventional manner.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A pipe machining apparatus comprising:
a frame;
a tool carrier coupled to and movable relative to the frame;
a tool support coupled to and movable with the tool carrier relative to the frame, wherein the tool support is adapted to support a tool;
a gearing arrangement configured to rotate the frame, the gearing arrangement comprising:
a pinion gear having teeth,
a backlash adjustment gear having teeth, the backlash gear being moveable relative to the pinion gear and being capable of being fixed in position relative to the pinion gear,
a bull gear having teeth, the teeth of the bull gear capable of being engaged with the teeth of the pinion gear and with the teeth of the backlash adjustment gear, the bull gear affixed to the tool carrier;
a locking assembly configured to fix the position of the backlash adjustment gear relative to the pinion gear,
wherein when the locking assembly is in a first position, the pinion gear and the backlash adjustment gear are rotatable relative to each other, and when the locking assembly is in a second position, the pinion gear and the backlash adjustment gear are not rotatable relative to each other; and
a motor engaged with the pinion gear, the motor configured to rotate the gearing arrangement, thereby rotating the tool carrier.

2. The pipe machining apparatus of claim 1, wherein the backlash adjustment gear has a passageway therethrough, and the teeth of the pinion gear are provided on a base of the pinion gear and the pinion gear further has a shaft extending from the base, the shaft extending into the passageway of the backlash adjustment gear, and the locking assembly is positioned between the shaft of the pinion gear and the backlash adjustment gear.

3. The pipe machining apparatus of claim 2, wherein the pinion gear has a second shaft extending from the base, the second shaft having a recess configured to engage with the motor.

4. The pipe machining apparatus of claim 1, wherein the locking assembly comprises:
an inner collar having an outer surface with upper angled portion and a lower angled portion, the inner collar engaged with the pinion gear, the inner collar formed from an interrupted ring having a slot therein;
an outer collar having an inner surface with upper angled portion and a lower angled portion, the outer collar formed from an interrupted ring having a slot therein, the outer collar capable of being engaged with the backlash adjustment gear;
an upper circular ring positioned between the upper angled portions of the inner and outer collars, the upper circular ring having an outer angled surface which is configured to engage the upper angled portions of the inner and outer collars;
a lower circular ring positioned between the lower angled portions of the inner and outer collars, the lower circular ring having an outer angled surface which is configured to engage the lower angled portions of the inner and outer collars; and
a plurality of fasteners extending through the upper and lower rings,
wherein rotation of the fasteners causes the upper and lower rings to move relative to the inner and outer collars, thereby contracting the inner collar and expanding the outer collar.

5. The pipe machining apparatus of claim 3, wherein the backlash adjustment gear has a passageway therethrough, and the pinion gear has a shaft which extends into the passageway of the backlash adjustment gear, and the locking assembly is positioned between the shaft of the pinion gear and the backlash adjustment gear.

6. The pipe machining apparatus of claim 5, wherein the fasteners are threadedly engaged with the upper and lower circular rings.

7. The pipe machining apparatus of claim 5, wherein the teeth of the pinion gear and the teeth of the backlash adjustment gear have the same profile.

8. The pipe machining apparatus of claim 4, wherein the fasteners are threadedly engaged with the upper and lower circular rings.

9. The pipe machining apparatus of claim 4, wherein the teeth of the pinion gear and the teeth of the backlash adjustment gear have the same profile.

10. The pipe machining apparatus of claim 1, wherein the teeth of the pinion gear and the teeth of the backlash adjustment gear have the same profile.

11. The pipe machining apparatus of claim 1, wherein the teeth of the pinion gear have curved flanks, and the teeth of the backlash adjustment gear have curved flanks.

12. The pipe machining apparatus of claim 1, comprising a plurality of tools mounted on the tool support.

* * * * *